(12) United States Patent
Song

(10) Patent No.: US 10,027,863 B2
(45) Date of Patent: Jul. 17, 2018

(54) AUTO-LIFT APPARATUS FOR CCTV CAMERA MAINTENANCE

(71) Applicant: OTS CO., LTD., Daejeon (KR)

(72) Inventor: Moo Sang Song, Daejeon (KR)

(73) Assignee: OTS CO., LTD., Daejeon (KR)

( * ) Notice: Subject to any disclaimer, the term of this patent is extended or adjusted under 35 U.S.C. 154(b) by 0 days.

(21) Appl. No.: 14/770,575

(22) PCT Filed: Mar. 19, 2015

(86) PCT No.: PCT/KR2015/002658
§ 371 (c)(1),
(2) Date: Aug. 26, 2015

(87) PCT Pub. No.: WO2015/156513
PCT Pub. Date: Oct. 15, 2015

(65) Prior Publication Data
US 2017/0126941 A1 May 4, 2017

(30) Foreign Application Priority Data
Apr. 11, 2014 (KR) .................. 10-2014-0043846

(51) Int. Cl.
*H04N 5/225* (2006.01)
*B66D 1/12* (2006.01)
*H04N 7/18* (2006.01)

(52) U.S. Cl.
CPC ............ *H04N 5/2253* (2013.01); *B66D 1/12* (2013.01); *H04N 5/2251* (2013.01); *H04N 7/183* (2013.01)

(58) Field of Classification Search
CPC .. H04N 5/2253; H04N 5/2252; H04N 5/2251; H04N 7/183; B66D 1/12; B66D 1/20
USPC ..... 248/125.1; 254/342, 346, 352, 362, 376, 254/380
See application file for complete search history.

(56) References Cited

U.S. PATENT DOCUMENTS

| | | | | |
|---|---|---|---|---|
| 4,429,355 A | * | 1/1984 | Garchinsky | F21V 21/38 362/249.09 |
| 5,141,206 A | * | 8/1992 | Shaffer | B66D 3/00 254/266 |
| 6,408,572 B1 | * | 6/2002 | Uchimura | E05F 11/485 464/92 |
| 7,033,048 B2 | * | 4/2006 | Sin | F21V 21/36 362/286 |
| 7,469,881 B2 | * | 12/2008 | Alipour | B66C 1/10 254/272 |
| 8,128,068 B2 | * | 3/2012 | Chepurny | A61G 7/1015 254/343 |

(Continued)

FOREIGN PATENT DOCUMENTS

| KR | 101184989 B1 | 10/2012 |
|---|---|---|
| KR | 101299121 B1 | 8/2013 |

*Primary Examiner* — Nkeisha Smith
(74) *Attorney, Agent, or Firm* — The PL Law Group, PLLC

(57) ABSTRACT

The present invention relates to an auto-lift apparatus for CCTV camera maintenance, wherein a CCTV camera is fixed to a lower end portion of a band wound with a predetermined width to maintain the CCTV camera on the ground, the band is made of an insulating material, a control unit which controls the CCTV camera to rise or fall is provided in a slot type, and the CCTV camera rises, falls, and is kept stopping through coupling of worm gears.

8 Claims, 7 Drawing Sheets

(56) References Cited

U.S. PATENT DOCUMENTS

| | | | | |
|---|---|---|---|---|
| 8,256,745 B2* | 9/2012 | Latoria | .................... | B66D 3/18 |
| | | | | 254/342 |
| 8,720,865 B2* | 5/2014 | Anderson | ................ | B66D 1/04 |
| | | | | 254/266 |
| 2008/0115414 A1* | 5/2008 | Hogan | ................... | A01G 9/022 |
| | | | | 47/66.6 |
| 2009/0173924 A1* | 7/2009 | Alipour | .................... | B66C 1/10 |
| | | | | 254/362 |
| 2010/0051767 A1* | 3/2010 | Erel | ........................ | B66C 23/02 |
| | | | | 248/205.1 |
| 2016/0353065 A1* | 12/2016 | Nicholson | .............. | H04N 7/183 |
| 2017/0009937 A1* | 1/2017 | Shin | .................... | F16M 13/027 |

\* cited by examiner

US 10,027,863 B2

AUTO-LIFT APPARATUS FOR CCTV CAMERA MAINTENANCE

CROSS REFERENCE TO RELATED APPLICATIONS AND CLAIM OF PRIORITY

This patent application is a National Phase application under 35 U.S.C. § 371 of International Application No. PCT/KR2015/002658, filed Mar. 19, 2015, which claims the priority based on KR 10-2014-0043846 filed Apr. 11, 2014, entire contents of which are incorporated herein by reference.

TECHNICAL FIELD

The present invention relates to an auto lift apparatus CCTV camera maintenance and, more specifically, to an auto lift apparatus for CCTV camera maintenance, in which the CCTV camera is fixed to a lower end portion of a band wound with a predetermined width to maintain the CCTV camera on the ground, the band is made of an insulating material to prevent electric leakage or short circuit even in case of rain, a control unit which controls the CCTV camera to rise or fall is detachable in a slot type or is provided at a predetermined height at which a hand of a worker can reach a ground structure, the CCTV camera rises, falls, and is kept stopping through coupling of worm gears, and monitoring can continue through an auxiliary camera during maintenance of a CCTV.

BACKGROUND ART

CCTV cameras are used to grasp unmanned monitoring activities or road traffic conditions, the CCTV camera is installed at the upper portion of an indoor or outdoor structure to secure visibility of the camera, and there is difficulty that a worker has to rise and work on the structure using a ladder or a high place working vehicle to maintain the CCTV camera.

The difficulty is also applied to a case of a lamp, a lifting apparatus capable of lowering the lamp for maintenance of the lamp is disclosed, and the lifting apparatus may be used as a device capable of lowering the CCTV camera for maintenance of the CCTV camera.

Korean Registered Patent No. 10-1184989 (registered date: Sep. 17, 2012) is disclosed as a lifting apparatus for a lamp, and FIG. 1 is an exploded perspective view illustrating a lamp lifting apparatus according to the related art. As illustrated in FIG. 1, the lifting apparatus, in which a rotation reel 2 which rotates forward and backward through a motor 1 is provided in a case 3, and an upper socket 4 and a lower socket 5 which supply electricity to a light device at the time of mutual coupling are provided at the lower portion of the case 3 and the upper portion of the light device, respectively, the lower end portion of a band 6 which is wound on the rotation reel 2 is fixed to the lower socket 5 with the lower end portion passing through a passing hole 7 formed in the upper socket 4.

The band 6 has a predetermined width and, even when the band 6 is twisted at the time of returning the lamp after maintenance, untwists the twisting by the passing hole 7, thereby playing a role of normally recombining the upper socket 4 and the lower socket 5.

However, the band 6 is made of metal to enhance the strength, the metallic band has a limit to have a predetermined or more thickness to secure flexibility for being wound on the rotation reel 2, breaking may occur thereby during working for maintenance, and a safety accident may occur due to electricity flowing through the band at the time of electric leakage or short circuit.

In addition, the metallic band may be twisted during rising or falling to cause erroneous contact between terminals, thereby being short-circuited, which is a problem. The CCTV camera includes a plurality of terminals such as a power supply terminal, image information transmission and reception terminals of the CCTV camera and/or drive signal transmission and reception terminals of the CCTV camera, and there is a problem that components including the CCTV camera may be broken due to the short circuit or the like.

Korean Registered Patent No. 10-1299121 (registered date: Aug. 16, 2013) registered after being applied earlier by the applicant has a problem that a band is made of a strip band through which electricity may flow similarly to the related art and is vulnerable to electric leakage or short circuit outdoors, a control circuit including an RX board and the like is placed together with a machinery device such as a forward and reverse motor in a main body, there is difficulty that the main body has to be disassembled overall for maintenance of the control circuit, a worker has to work for disassembling for a long time in the air using a ladder or the like, and there is a risk according thereto. In addition, in the technique described above, in a state where the CCTV camera is allowed to fall onto the ground for maintenance of the CCTV camera, there is a problem that imaging of surroundings is stopped and a natural operation cannot be performed.

SUMMARY

The invention has been made to solve the problems of the related art, and an object of the invention is to provide an auto-lift apparatus for CCTV camera maintenance, in which a control unit which controls a CCTV camera to rise or fall is detachable from a case in a slot type or is provided at a predetermined height at which a hand of a worker can reach a ground structure, to stably perform maintenance of the control unit on the ground, a wound band is made of an insulating material to prevent a risk of electric leakage or short circuit caused by rain even in case of outdoor installation, and imaging of surroundings is performed through an auxiliary camera even during maintaining a CCTV camera unit.

An auto-lift apparatus for CCTV camera maintenance according to the invention to solve the problem includes: a case unit which is fixed to an upper portion of an indoor or outdoor structure and has a slot groove formed to insert and fix a slot case; a rising and falling unit which includes a winding reel provided in the case unit, and an insulating band wound on the winding reel to allow the CCTV camera to rise or fall through an operation of winding on or unwinding from the winding reel; a terminal unit which includes an upper socket fixed to a lower portion of the case unit and has a band passing hole for allowing the insulating band to pass at a center thereof, and a lower socket provided at a lower portion of the upper socket to be inserted, the upper socket and the lower socket include a plurality of connection terminals, and power or signal connection is made by inserting the lower socket to the upper socket; a camera unit to which the lower socket is fixed at an upper portion thereof and a lower end portion of the insulating band is also fixed, and which is connected to the connection terminal; a drive unit which includes a driven worm wheel fixed to a rotation shaft of the winding reel, a drive worm gear coupled to the driven worm wheel, a drive motor coupled to the drive worm gear, and stop means provided on the rotation shaft of the winding reel; and a control unit which controls the CCTV camera unit to rise or fall through a drive command signal for the rising and falling unit, controls the CCTV camera unit to perform imaging, or controls video information to be transmitted or received.

The control unit according to the invention includes a slot case inserted and fixed to the case unit in a slot type and, in a state where the slot case is inserted to a slot groove of the case unit, a connection terminal formed at an upper portion of the slot groove is connected to the control terminal. The stop means according to invention includes a count gear which is fixed to the rotation shaft of the winding reel, and a photo sensor which is disposed on both sides of a row of teeth of the count gear.

Meanwhile, the insulating band according to the invention has a width of 40 to 100 mm, is made of a non-conductive fiber material, and further includes twist preventing edges on both ends in a longitudinal direction, and the upper socket further includes a band passing hole corresponding to the twist preventing edges.

In addition, the auto-lift apparatus for CCTV camera maintenance according to the invention further includes an auxiliary camera which starts operating according to a control of the control unit at the time of falling of the CCTV camera unit, and stops operating by the control of the control unit when the CCTV camera unit rises to come in contact with the connection terminal.

According to the invention, a control unit which controls a CCTV camera to rise or fall is detachable from a case in a slot type, the control unit can be maintained on the ground by detecting the control unit from the case, or the control unit is provided such that a hand of a worker can reach the inside of a signal control box formed at a predetermined height of the structure, thereby stably maintaining the control on the ground, as an advantage.

In addition, according to the invention, a short circuit or the like caused by twist of the insulating band at the time of rising and falling of the CCTV camera unit can be prevented through the insulating band provided with twist preventing edges on both ends in a longitudinal direction or having a predetermined width, and the insulating band is made of an insulating material such that a worker or the like does not receive an electric shock even in case of rain outdoors, as an advantage.

In addition, according to the invention, imaging about surroundings is performed through the auxiliary camera even during maintenance of the CCTV camera unit, and monitoring of the surroundings can be continuously performed, as an advantage.

In addition, according to the invention, rising, falling, and keeping a stop state of the CCTV camera unit can be stably performed through a driven worm wheel and stop means which are provided on a rotation shaft of a winding reel and a drive worm gear coupled to the driven worm wheel, as an advantage.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

10: CASE UNIT
11: CASE BODY
20: RISING AND FALLING UNIT
21: WINDING REEL
25: INSULATING BAND
27: TWIST PREVENTING EDGE
30: TERMINAL UNIT
31: UPPER SOCKET
31*a*, 35*a*: CONNECTION TERMINAL
33: BAND PASSING HOLE
35: LOWER SOCKET
40: CCTV CAMERA UNIT
41: CAMERA CASE
50: DRIVE UNIT
51: DRIVEN WORM WHEEL
53: DRIVE WORM GEAR
55: DRIVE MOTOR
57: STOP MEANS
57*a*: COUNT GEAR
57*b*: PHOTO SENSOR
60: CONTROL UNIT
61: SLOT CASE
61*a*: CONTROL TERMINAL
62: SLOT GROOVE
63: CONNECTION TERMINAL
100: STRUCTURE
200: HOUSING OR SIGNAL CONTROL BOX

DETAILED DESCRIPTION

Hereinafter, preferred embodiments of the invention will be descried in more detail with reference to the accompanying drawings.

Figure 1:
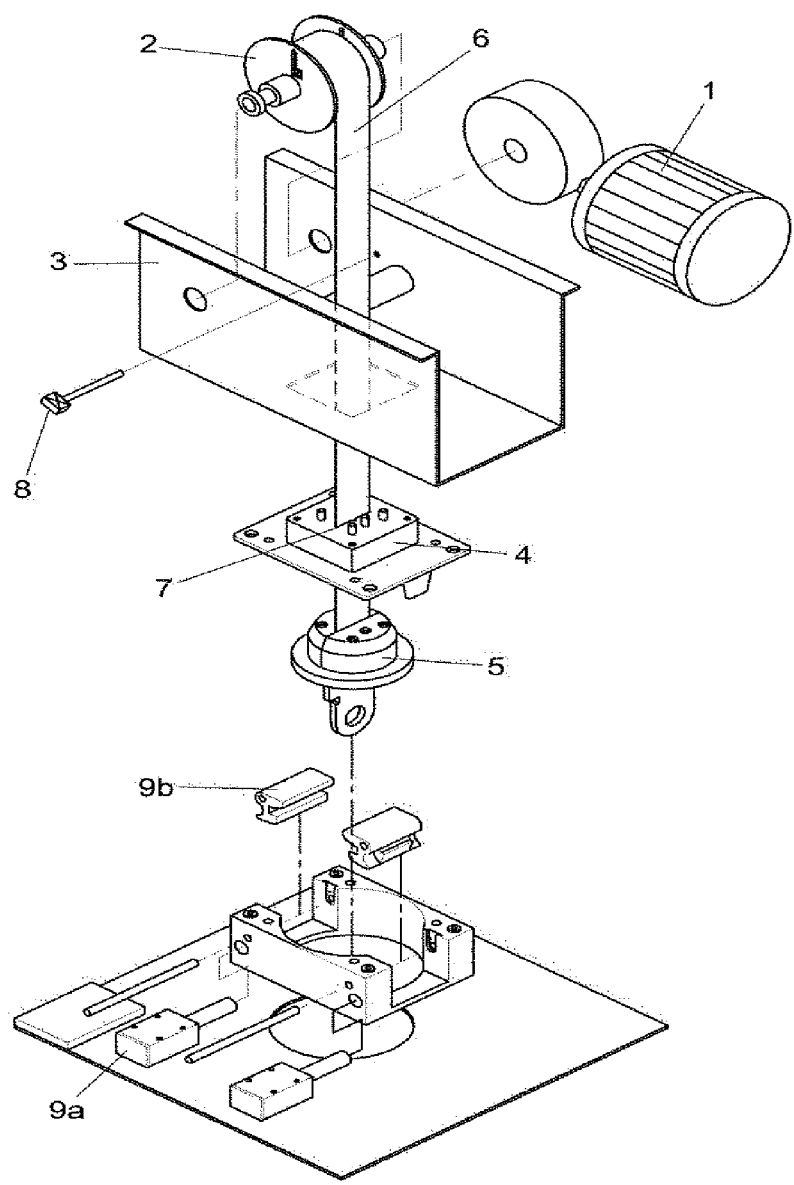
FIG. 1 is an exploded perspective illustrating a lamp lifting apparatus according to the related art.
Figure 2:
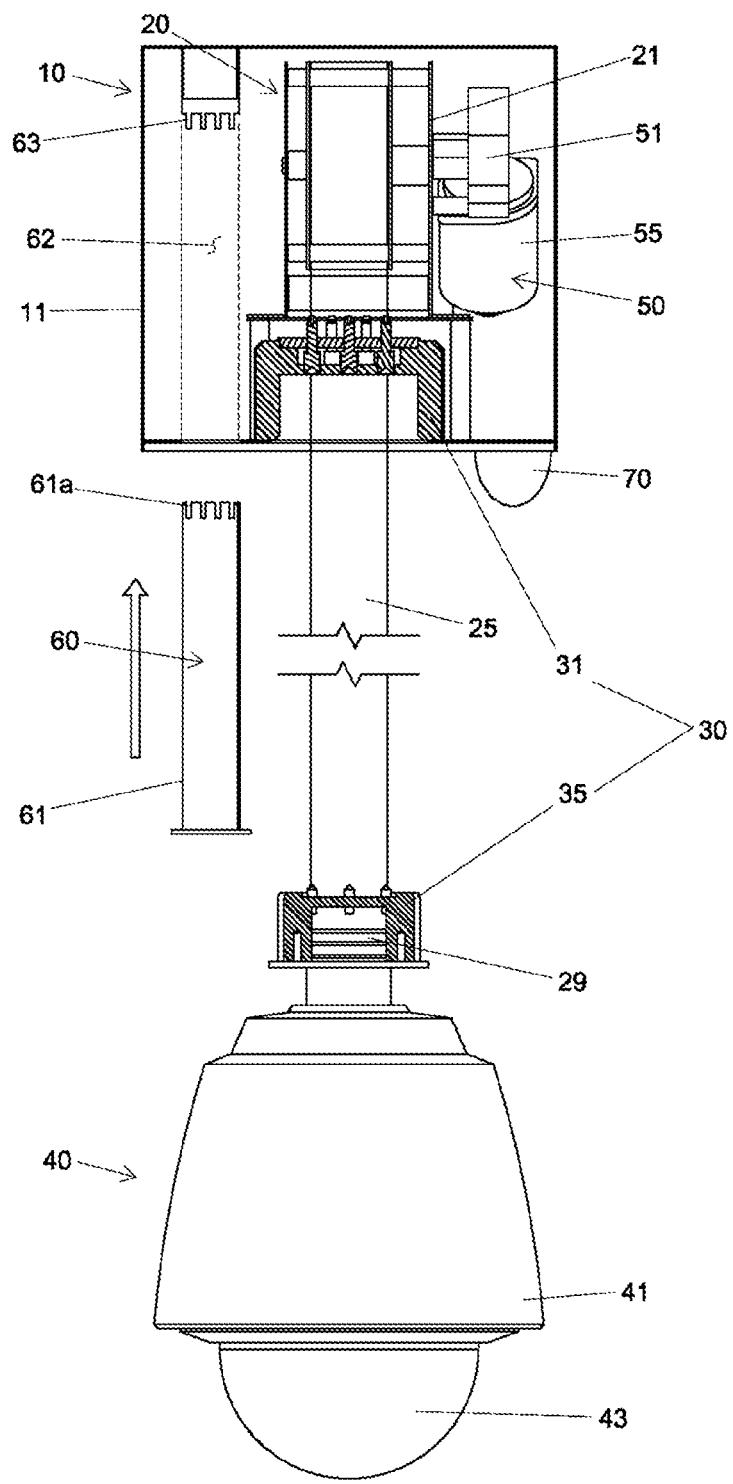
FIG. 2 is a front view illustrating an auto-lift apparatus for CCTV camera maintenance according to the invention.

FIG. 2 is a front view illustrating an auto-lift apparatus for CCTV camera maintenance according to the invention. Referring to FIG. 2, the invention includes a case unit 10 which is fixed to an upper portion of an indoor or outdoor structure, a rising and falling unit 20 which is rotatably provided in the case unit 10, a terminal unit 30 which includes an upper socket 31 provided on a bottom face of the case unit 10 and an upper socket 35 fixed to an end portion of an insulating band 25 of the rising and falling unit 20, a CCTV camera unit 40 which is fixed to the lower socket 35, a drive unit 50 which is coupled to a rotation shaft of a winding reel 21 of the rising and falling unit 20, and a control unit 60 which controls the CCTV camera unit 40 to rise or fall through a drive command signal for the rising and falling unit 20, controls the CCTV camera unit to perform imaging, or controls video information to be transmitted or received.

With such a configuration, according to the invention, maintenance of the CCTV camera is performed in a state where the CCTV camera unit 40 is allowed to fall onto the ground, the control unit formed in a slot type can be detached from the case to be repaired on the ground, and the control unit can be easily replaced by a new one when it is determined that the control unit cannot be maintained, as advantages. In addition, the insulating band 25 is made of an insulating fiber material having a predetermined width, to prevent connection between different kinds of terminals caused by twist and to prevent electric leakage or the like through the insulating band during working in a wet environment such as rain, and returning and stopping of the CCTV camera unit 40 is stably performed after completion of maintenance work.

The case unit 10 has a configuration of housing the rising and falling unit 20 therein, the case body 11 is formed in a cylindrical or box shape, a bracket for being fixed to the structure is provided at the upper portion of the case body 11, and a hole for mounting the upper socket 31 of the terminal unit 30 to be described later and the control unit 60 is formed on a lower face (bottom face) of the case body 11.

The case unit 10 may be made of a material such as stainless steel or aluminum alloy to improve weather resistance and water resistance against external environment in preparation to a situation of being installed outdoors, particularly, in a case of being provided near a road, a member fixing portion of the case unit may be loose by vibration caused by vehicular traffic or wind, thus looseness preventing means such as a washer may be provided at the fixing portion, and a packing treatment may be performed in a gap of the case body 11 to prevent dust from flowing in.

Figure 3:
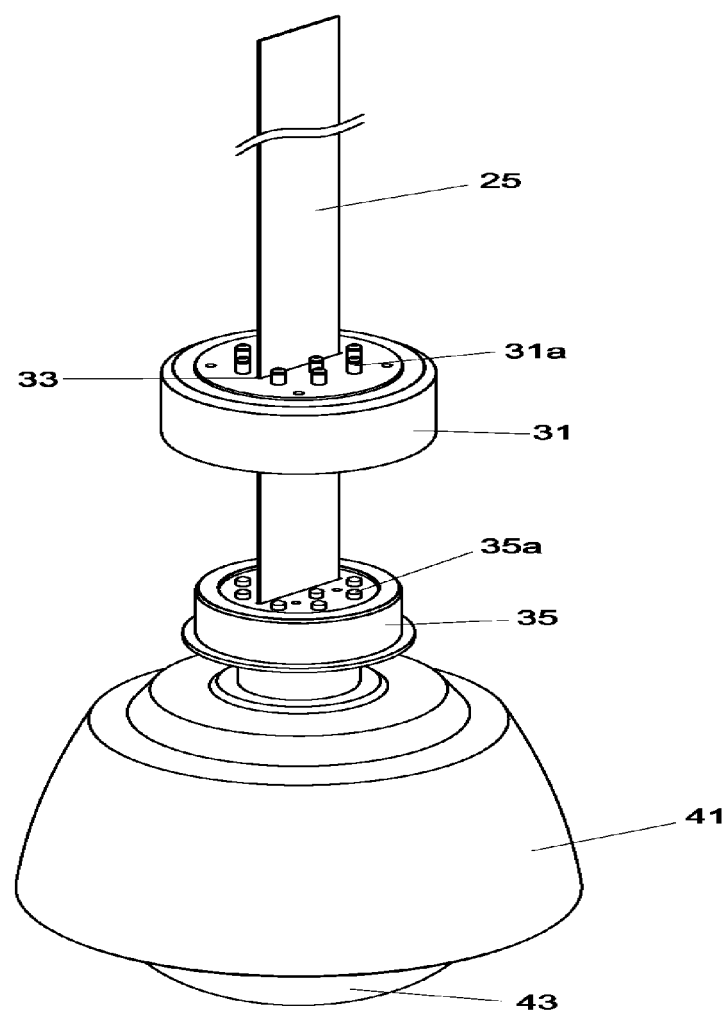
FIG. 3 is a perspective view illustrating a terminal unit and a CCTV camera unit of an auto-lift apparatus for CCTV camera maintenance according to the invention.
Figure 4:
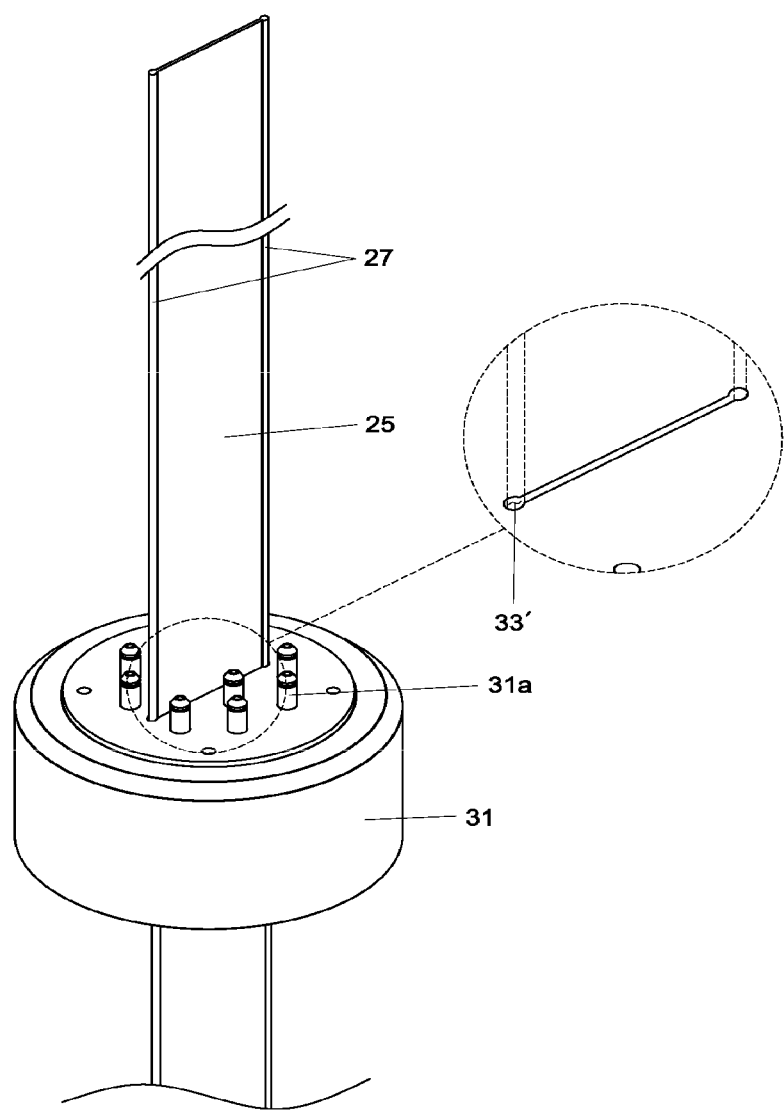
FIG. 4 is a perspective view illustrating another example of an insulating band of an auto-lift apparatus for CCTV camera maintenance according to the invention.

FIG. 3 is a perspective view illustrating a terminal unit and a CCTV camera unit of an auto-lift apparatus for CCTV camera maintenance according to the invention, and FIG. 4 is a perspective view illustrating another example of an insulating band of the auto-lift apparatus for CCTV camera maintenance according to the invention. Referring to FIG. 2 to FIG. 4, the rising and falling unit 20 is configured to allow the CCTV camera unit 40 to rise or fall, and includes a winding reel 21 which is provided in the case unit 10, an insulating band 25 which is wound on the winding reel 21, and a fixing clip 29 which fixes a lower end portion of the insulating band 25 to the CCTV unit 40.

As described above, the metallic band of the related art is wound on the reel and has a limit to have a predetermined or more thickness to have flexibility, and there is a problem that the band is thereby broken during a repeated rising and falling operation. In addition, when the metallic band is twisted, a short circuit or the like may occur due to erroneous connection between terminals, and there is problem that components constituting the CCTV camera unit may be thereby broken. In addition, when the metallic band has conductive characteristics and when a maintenance work is performed in case of rain or in a state where the metallic band is wet, a worker may be danger due to electric leakage or short circuit from the metallic band.

The insulating band 25 is to solve the problems of the metallic band, and is made of a fibrous material having an insulating property and predetermined strength to prevent a risk caused by electric leakage and short circuit and to keep strength even in the repeated rising and falling work. The predetermined strength means strength to bear weights of the CCTV camera unit, the lower socket, and the like suspended on the insulating band or higher, and is not particularly limited. In other words, the size or type of the CCTV camera unit or the lower socket may be varied according to areas or situations, and the insulating band according to the invention is made of a material having to bear individual weights of the CCTV camera unit, the lower socket, and the like which may be varied according to situations.

Generally, a twist phenomenon can be suppressed as the width of the band gets wider or the thickness gets thicker, and when the band is twisted, the twist is immediately untwisted. Generally, the metallic band of the related art has a width of 25 to 30 mm, whereas the insulating band 25 used in the invention is manufactured with a width of 40 mm or more, increase in size and weight of the rising and falling unit 20 for sustaining the increased width is not preferable, and thus the width of the insulating band in the invention is formed in the range of 40 to 100 mm.

As another example of the insulating band 25, twist preventing edges 27 may be further provided on both ends of the insulating band to suppress the twist phenomenon of the insulating band 25. In addition thereto, the upper socket 31 to be described later is provided with a band passing hole 33' having a shape corresponding to twist preventing edges at a corresponding position where the twist preventing edges rises and falls. Accordingly, the twist preventing edges 27 suppress the twist of the insulating band 25, and both ends of the band passing hole 33' stably guide the twist preventing edges such that the twist of the insulating band is untwisted at the time of rising of the CCTV camera unit 40. Referring to FIG. 4, it can be seen that the twist preventing edges 27 protrude to be thicker than the thickness of the insulating band at both ends of the insulating band, thereby being formed in a circular shape. The band passing hole is also formed in the circular shape corresponding to the twist preventing edges. The twist preventing edges and/or the band passing hole may be formed in various shapes as necessary, as well as the circular shape.

The terminal unit 30 includes, as a configuration for supplying power to the CCTV camera unit 40 and for transmission and reception a video information signal of the camera and a control signal of the camera, an upper socket 31 which is fixed to a lower portion of the case unit 10 and a lower socket 35 is provided to be inserted to the lower portion of the upper socket 31 in a state of being fixed to the upper portion of the CCTV camera unit 40, and includes a plurality of connection terminals 31a and 35a for power supply and for transmission and reception of a video information signal or a control signal at positions corresponding to the upper socket 31 and the lower socket 35, and the connection terminals 31a and 35a are connected to each other in a state where the lower socket 35 is inserted to the lower portion of the upper socket 31.

In addition, a band passing hole 33 through which the insulating band 25 passes is formed at the center of the upper socket 31, the CCTV camera unit 40 rises or falls while the insulating band 25 passes through the band passing hole 33, the twist phenomenon of the insulating band 25 which may occur particularly at the time of rising of the CCTV camera unit 40 can be prevented by the band passing hole 33, and the connection terminal 31a and 35a are normally connected to each other in a state where the twist phenomenon of the insulating band is prevented.

Figure 5:
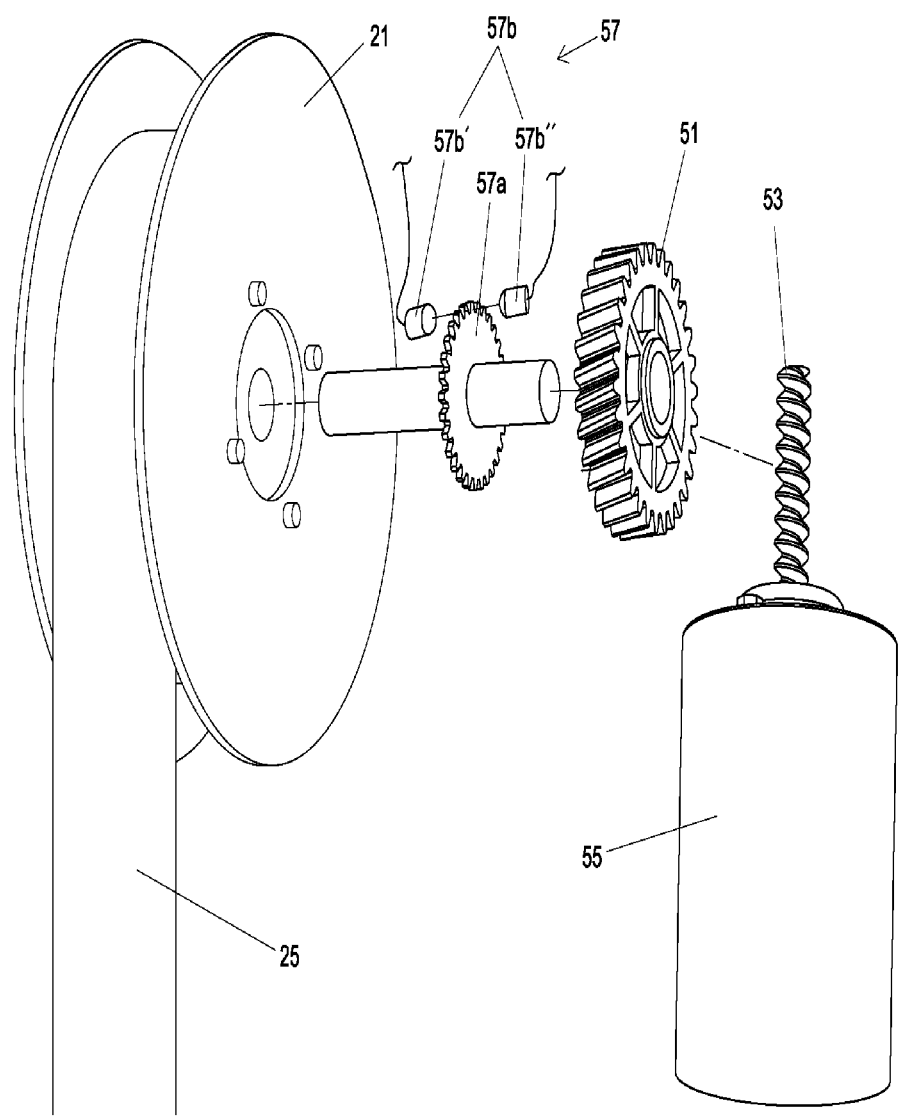
FIG. 5 is an exploded perspective view illustrating a drive unit of an auto-lift apparatus for CCTV camera maintenance according to the invention.

FIG. 5 is an exploded perspective view illustrating a drive unit of an auto-lift apparatus for CCTV camera maintenance according to the invention. Referring to FIG. 2 and FIG. 5, the CCTV camera unit 40 is provided therein with a camera, a hemispherical cover 43 for securing a field of vision of the camera and protecting the camera is provided under the camera case 41, the upper portion of the camera case 41 is connected to the lower socket 35 of the terminal unit through the fixing clip 29, and a power supply line for supplying power to the CCTV camera unit 40 and/or signal lines for transmitting or receiving a video information signal or a control signal are thereby connected to the connection terminal 35a.

The drive unit 50 includes, as a configuration for rotating the winding reel 21 forward or backward for rising or falling of the CCTV camera unit 40, a driven worm wheel 51 which is fixed to a rotation shaft of the winding reel 21, a drive worm gear 53 which is coupled to the driven worm wheel 51, a drive motor 55 which is coupled to the drive worm gear 53, and stop means 57 which is provided on the rotation shaft of the winding reel 21.

The driven worm wheel 51 and the drive worm gear 53 are members for transferring power of the drive motor 55 to the winding reel 21, and particularly plays a role of keeping a stop state of the CCTV camera unit 40 at the time of stopping thereof. Although it is easy to rotate the drive worm gear 53 and the driven worm wheel 51, great rotational force is required to rotate the driven worm wheel 51 and the drive worm gear 53, and there is a limit of practical difficulty. That is, according to the invention, backward rotation is prevented using the driven worm wheel and the drive worm gear and, when the insulating band 25 is about to fall by a weight of the CCTV camera unit 40 in a state where the upper socket 31 and the lower socket 35 are coupled, the falling of the insulating band is suppressed in a state where the driven worm wheel 51 and the drive worm gear 53 are coupled to each other, thereby stably keeping the connection between the connection terminals 31a and 35a.

The drive motor 55 is a member for transferring power to the drive worm gear 53, includes a motor capable of rotating forward and backward for rising or falling of the CCTV camera unit 40, and rotates forward, backward, or stops rotating according to control signals of the control unit 60.

The stop means 57 is a member for allowing the CCTV camera unit 40 to fall to a height suitable for a maintenance work or for stopping the drive motor 55 when the connection terminals 31a and 35a are connected to each other at the time of rising, and includes a count gear 57a which is fixed to the rotation shaft of the winding reel 21 and a photo sensor 57b which is disposed on both sides of a row of teeth of the count gear 57a and is connected to the control unit 60.

The photo sensor 57b includes a light irradiating unit 57b' which irradiates light and a light receiving unit 57b" which receives the light of the light irradiating unit 57b', and the row of teeth of the count gear 57a is positioned between the light irradiating unit 57b' and the light receiving unit 57b". When the winding reel 12 rotates, the row of teeth of the count gear 57a repeatedly blocks the light of the photo sensor 57b, and the light receiving unit 57b" repeatedly senses brightness and darkness of the light. The control unit 60 counts the number of repetition times of brightness and darkness, compares the number of repetition times with a set value provided therein, and transmits a stop command signal to the drive motor 55 when the number of repetition times of brightness and darkness reaches the set value.

The control unit 60 controls the CCTV camera unit 40 to rise or fall through the drive command signal for the rising and falling unit 20, controls the CCTV camera unit to perform imaging, or controls video information to be transmitted or received, and includes a slot case 61 which is formed in a box shape and is inserted and fixed to a slot groove 62 formed in the case unit 10, a printed circuit board which is provided in the slot case 61 to process a video signal or a control signal, and a micro control unit (MCU) which is provided on the printed circuit board. The power line for applying power to the drive motor, the CCTV camera, and the like is provided separately from the printed circuit board and may be directed connected from the ground, but the power line may be connected to the printed circuit board together.

The invention has an advantage that the control unit is provided in a slot type and, when maintenance of the control unit is necessary, the control unit is simply detached from the case and then a maintenance work can be performed on the ground. In other words, in the related art, the control circuit is provided together with a mechanical device such as a forward and backward motor in the body unit, the body unit has to be disassembled for maintenance of the control circuit, and there is difficulty that a worker has to directly work for disassembling in the air using a ladder or the like. However, in the invention, the control unit is detached from the case in the air and then performs a maintenance work on the ground, thereby easily performing the maintenance work by a worker.

Figure 6:
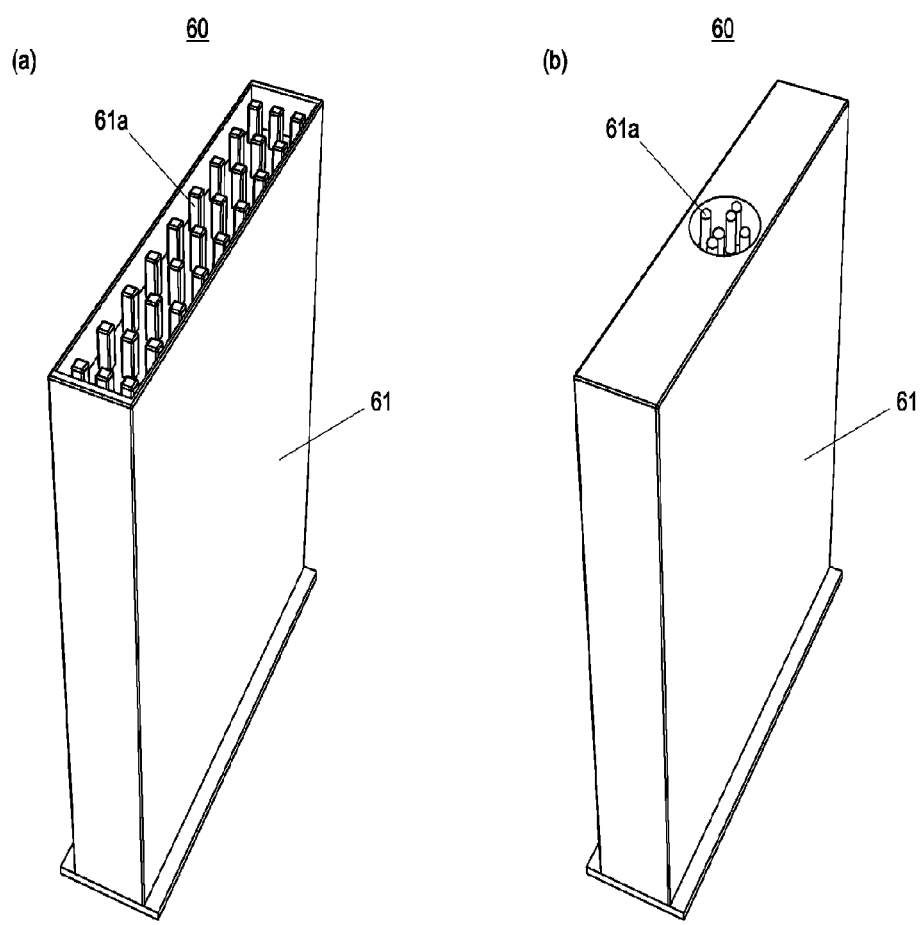
FIG. 6 is a perspective view illustrating a control unit of an auto-lift apparatus for CCTV camera maintenance according to the invention.

FIG. 6 is a perspective view illustrating the control unit 60 of the auto-lift apparatus for CCTV camera maintenance. According to the invention, in a state where the slot case 61 of the control unit is inserted to the slot groove 62, when the control terminal 61a formed at the upper portion of the slot case is closely coupled to the connection terminal 63 of the slot groove 62, the connection is completed, and vertical drive, imaging and/or transmission and reception of a control signal of the CCTV camera can be performed according to an input of the control signal through a remote controller or cable. As illustrated in FIG. 6(a) and FIG. 6(b), an external shape of the control unit and a structure of the control terminal may be variously formed, and a connection terminal of the slot groove may be variously formed corresponding thereto. In the invention, the control terminal is formed in a male screw type and the connection terminal corresponding thereto may be formed in a female screw type, but the control terminal may be formed in the female screw type and, in this case, the connection terminal may be formed in the male screw type.

Detachment between the slot case and the slot groove may be achieved using a general detachment member, and detailed description is omitted in the invention. In addition, coupling between the control terminal 61a formed at the upper portion of the slot case and the connection terminal 63 formed in the slot groove may be similar to, for example, a coupling manner in which a terminal pin of a printed circuit board is inserted to a terminal groove formed in a computer body, the coupling manner may be various as long as power can be supplied or a signal can flow through connection between terminals, and detailed description is omitted in the present application.

Differently from FIG. 6, the control unit of the invention may be provided in a housing or a signal control box 200 formed at a predetermined height of a structure 100, thereby stably performing maintenance of the control unit on the ground. In this case, instead of omitting the slot groove 62 and the connection terminal 63 to and from which the control unit 60 is inserted and detached in the case body 11 illustrated in FIG. 6, the control unit may be provided in the housing or the signal control box, the size of the case is reduced thereby, and it is possible to reduce load kept by the structure 100.

Figure 7:
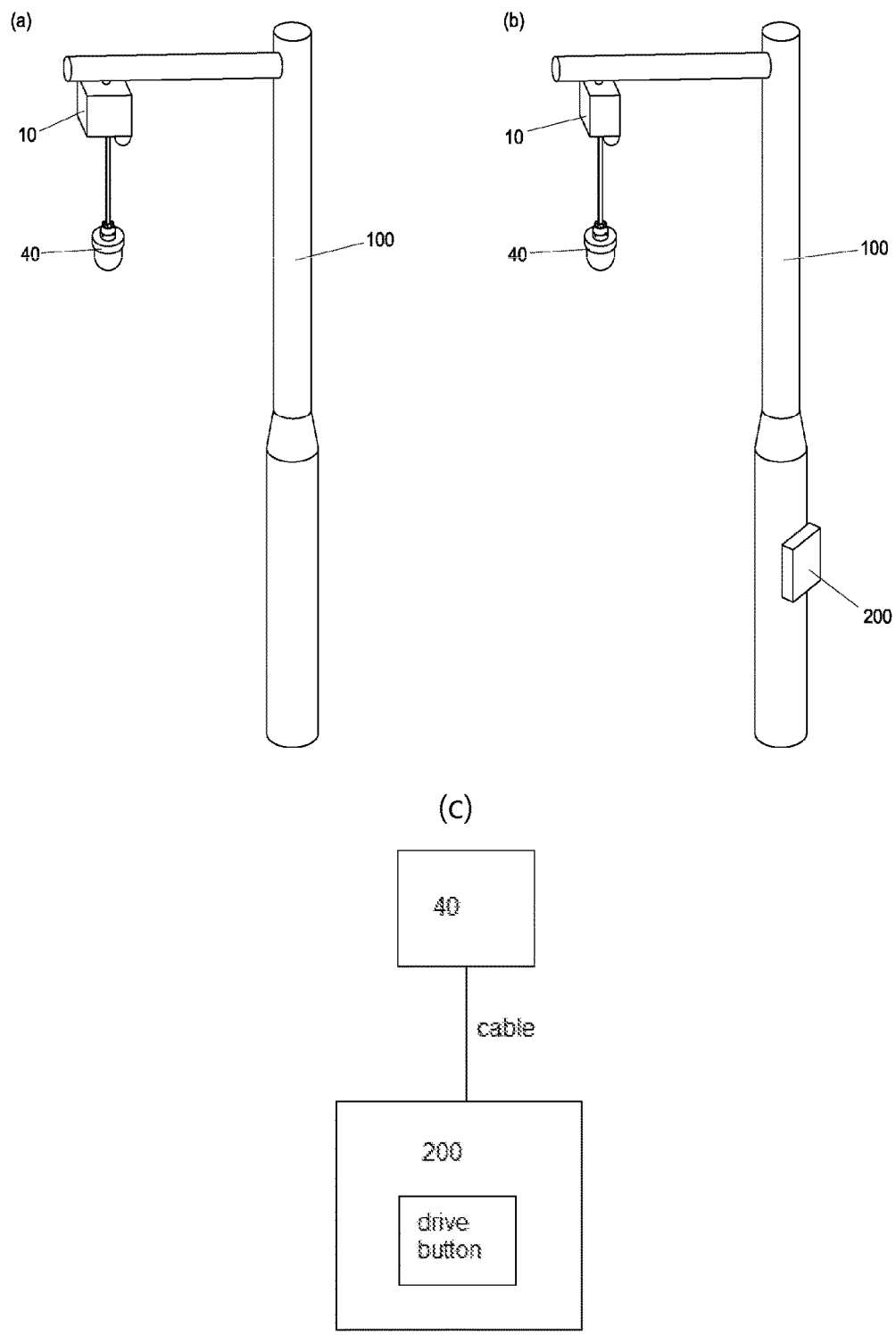
FIG. 7 is a diagram illustrating that an auto-lift apparatus for CCTV camera maintenance according to the invention is mounted on a structure.

FIGS. 7(a) to 7(c) is a diagram illustrating that the auto-lift device for CCTV camera maintenance according to the invention is mounted on the structure 100, where FIG. 7(a) illustrates that the control unit is included in the case unit 10 and FIG. 7(b) illustrates that the control unit is provided in a housing or a signal control box 200. As illustrated in FIG. 7(b), when the control unit is provided in the signal control box, it can be seen that the size of the case unit 10 is reduced. FIG. 7(c) illustrates the signal control box 200 using a cable and a drive button provided in the signal control box 200.

The control unit provided in the housing or the signal control box 200 illustrated in FIG. 7(b) may be provided in an insertion and detachment type as illustrated in FIG. 6 even in the housing or the signal control box and, for this end, a configuration corresponding to the slot groove and the connection terminal illustrated in FIG. 6 may be provided in the housing or the signal control box. However, when the housing or the signal control box is formed at a predetermined position which a hand of a worker can reach, for example, in a range of 500 to 1,500 mm from the ground, the control unit does not have to be necessarily provided in the slot type, and a circuit for processing a rising or falling control signal of the CCTV camera unit, a video imaging command signal based on the CCTV camera unit, and/or a series of control signals including transmission and reception of the imaged video has only to be provided in the housing or the signal control box. This is because it is possible to prevent a problem or a dangerous situation occurring from a work performed in the air in the related art since the worker performs a work on the ground.

In the invention, a rising or falling control signal of the CCTV camera unit 40, a video imaging command signal based on the CCTV camera unit, and/or a series of control signals including transmission and reception of the imaged video can be transmitted or received using a remote controller or cable. In the case of the type of using the cable, in a state where the control unit is formed in the detachable type as described in the example of FIG. 6 or the control unit is provided in the housing or the separate signal control box formed on the ground, the control may be performed in a state where a drive button is provided in the housing or the separate signal control box as illustrated in FIG. 7(b), and a rising or falling control signal of the CCTV camera unit 40, a video imaging command signal based on the CCTV camera unit, and/or transmission and reception of the imaged video can be controlled by turning on or off the drive button provided in the housing or the separate signal control box.

In the case of the type of wireless, an operation signal or the like can be controlled using a remote controller provided with a drive button and, for transmission to and reception from the control unit by the wire or wireless manner, the control unit may further include a wireless communication module (not illustrated) to communicate with the housing or separate signal control box on the ground or the remote controller.

Referring to FIG. 2, it can be seen that an auxiliary camera 70 is further provided at the lower end of the case unit 10. This is to solve the problem of difficulty in monitoring the surroundings in a state where the CCTV camera unit 40 falls and, when a signal representing that the connection terminals 31a and 35a is disconnected from each other in the state where the CCTV camera unit falls, the control unit drives the auxiliary camera and controls the auxiliary camera to monitor the surroundings instead of the CCTV camera unit. Accordingly, there is an advantage of continuously imaging the surroundings through the auxiliary camera even during maintenance of the CCTV camera unit.

In the invention, it is possible to control the auxiliary camera to be driven even in a situation of performing maintenance of the control unit as necessary. In other words, when the connection between the control terminal 61a formed at the upper portion of the slot case of the control unit and the connection terminal 63 formed at the upper portion of the slot groove is disconnected, the corresponding signal may be recognized as a drive signal of the auxiliary camera, and the signal is recognized as a drive stop signal of the auxiliary camera even when the connection between the control terminal 61a and the connection terminal 63 is started, thereby stopping the drive of the auxiliary camera.

Since the auxiliary camera is driven only when the CCTV is allowed to fall down for maintenance and thus monitoring for a long time is not required, a camera with resolution lower than that of the CCTV camera unit 40 may be used in consideration of manufacturing and maintenance costs. However, in order to prevent a momentary accident or risk, it is preferable that the auxiliary camera should also keep high resolution equivalent to that of the camera provided in the CCTV camera unit.

The control unit which controls the CCTV camera unit to rise or fall is detachable from the case in the slot type to be maintained on the ground by detaching the control unit from the case, the control unit is provided at the predetermined height at which a hand of a worker can reach a ground structure such as the signal control box, to stably perform maintenance of the control unit, a short circuit caused by twist of the insulating band can be prevented at the time of rising or falling of the CCTV camera unit through the insulating band having a predetermined width or having the twist preventing edges on both ends in a longitudinal direction, the insulating band is made of an insulating material to prevent a worker from receiving an electric shock outdoors even in case of rain, and the imaging for the surroundings is performed through the auxiliary camera even during maintenance of the CCTV camera unit, thereby continuously monitoring the surroundings, which are advantages.

Preferred embodiments of the invention have been described above, but it should be understood that the right scope of the invention is not limited thereto and substantial equivalents of the embodiments of the invention are included in the right scope of the invention, and a person skilled in the art can variously modify the embodiments within the scope which does not deviate from the spirit of the invention.

INDUSTRIAL APPLICABILITY

The invention is to provide an auto-lift apparatus for CCTV camera maintenance, wherein a control unit which controls a CCTV camera to rise or fall is detachable from a case in a slot type or is provided at a predetermined height at which a hand of a worker can reach a ground structure, to stably perform maintenance of the control unit, and imaging for the surroundings is performed through an auxiliary camera even during maintenance of the CCTV camera unit, and the auto-lift apparatus for CCTV camera maintenance can be utilized in this field.

The invention claimed is:
1. An auto-lift apparatus for CCTV camera maintenance, comprising:
 a case unit which is fixed to an upper portion of an indoor or outdoor structure and has a slot groove formed to insert and fix a slot case;

a rising and falling unit which includes a winding reel provided in the case unit, and an insulating band wound on the winding reel to allow a CCTV camera unit to rise or fall through an operation of winding on or unwinding from the winding reel;

a terminal unit which includes an upper socket fixed to a lower portion of the case unit and has a band passing hole for allowing the insulating band to pass at a center thereof, and a lower socket provided at a lower portion of the upper socket to be inserted, the upper socket and the lower socket include a plurality of connection terminals, and power or signal connection is made by inserting the lower socket to the upper socket;

the CCTV camera unit to which the lower socket is fixed at an upper portion thereof and a lower end portion of the insulating band is also fixed, and which is connected to the connection terminal;

a drive unit which includes a driven worm wheel fixed to a rotation shaft of the winding reel, a drive worm gear coupled to the driven worm wheel, a drive motor coupled to the drive worm gear, and stop means provided on the rotation shaft of the winding reel;

a control unit which controls the CCTV camera unit to rise or fall through a drive command signal for the rising and falling unit, or controls the CCTV camera unit to perform imaging; and a signal control box using a cable at a predetermined height from a ground such that a hand of a worker reaches the signal control box, wherein a rising or falling control signal of the CCTV camera unit, an imaging command signal by the CCTV camera unit, or a transmission and reception control signal of an image is transmitted to the control unit through a drive button provided in the signal control box.

2. The auto-lift apparatus for CCTV camera maintenance according to claim 1, wherein the insulating band has a width of 40 to 100 mm, and is made of a non-conductive fiber material.

3. The auto-lift apparatus for CCTV camera maintenance according to claim 1, wherein the insulating band further includes twist preventing edges on both ends in a longitudinal direction, and the upper socket further includes a band passing hole corresponding to the twist preventing edges.

4. The auto-lift apparatus for CCTV camera maintenance according to claim 1, further comprising an auxiliary camera which starts operating according to a control of the control unit at the time of falling of the CCTV camera unit, and stops operating by a control of the control unit when the CCTV camera unit rises to come in contact with the connection terminal.

5. The auto-lift apparatus for CCTV camera maintenance according to claim 1, wherein the control unit is separately provided in a housing or a signal control box provided at a predetermined height from the ground.

6. An auto-lift apparatus for CCTV camera maintenance, comprising:
a case unit which is fixed to an upper portion of an indoor or outdoor structure and has a slot groove formed to insert and fix a slot case;
a rising and falling unit which includes a winding reel provided in the case unit, and an insulating band wound on the winding reel to allow a CCTV camera unit to rise or fall through an operation of winding on or unwinding from the winding reel;
a terminal unit which includes an upper socket fixed to a lower portion of the case unit and has a band passing hole for allowing the insulating band to pass at a center thereof, and a lower socket provided at a lower portion of the upper socket to be inserted, the upper socket and the lower socket include a plurality of connection terminals, and power or signal connection is made by inserting the lower socket to the upper socket;
the CCTV camera unit to which the lower socket is fixed at an upper portion thereof and a lower end portion of the insulating band is also fixed, and which is connected to the connection terminal;
a drive unit which includes a driven worm wheel fixed to a rotation shaft of the winding reel, a drive worm gear coupled to the driven worm wheel, a drive motor coupled to the drive worm gear, and stop means provided on the rotation shaft of the winding reel; and
a control unit which controls the CCTV camera unit to rise or fall through a drive command signal for the rising and falling unit, or controls the CCTV camera unit to perform imaging;
wherein the control unit includes a slot case inserted and fixed to the case unit in a slot type and a control terminal, and
in a state where the slot case is inserted to a slot groove of the case unit, a connection terminal formed at an upper portion of the slot groove is connected to the control terminal.

7. An auto-lift apparatus for CCTV camera maintenance, comprising:
a case unit which is fixed to an upper portion of an indoor or outdoor structure and has a slot groove formed to insert and fix a slot case;
a rising and falling unit which includes a winding reel provided in the case unit, and an insulating band wound on the winding reel to allow a CCTV camera unit to rise or fall through an operation of winding on or unwinding from the winding reel;
a terminal unit which includes an upper socket fixed to a lower portion of the case unit and has a band passing hole for allowing the insulating band to pass at a center thereof, and a lower socket provided at a lower portion of the upper socket to be inserted, the upper socket and the lower socket include a plurality of connection terminals, and power or signal connection is made by inserting the lower socket to the upper socket;
the CCTV camera unit to which the lower socket is fixed at an upper portion thereof and a lower end portion of the insulating band is also fixed, and which is connected to the connection terminal;
a drive unit which includes a driven worm wheel fixed to a rotation shaft of the winding reel, a drive worm gear coupled to the driven worm wheel, a drive motor coupled to the drive worm gear, and stop means provided on the rotation shaft of the winding reel; and
a control unit which controls the CCTV camera unit to rise or fall through a drive command signal for the rising and falling unit, or controls the CCTV camera unit to perform imaging,
wherein the stop means includes a count gear which is fixed to the rotation shaft of the winding reel, and a photo sensor which is disposed on both sides of a row of teeth of the count gear.

8. The auto-lift apparatus for CCTV camera maintenance according to claim 1, further comprising a signal control box using a cable at a predetermined height from a ground such that a hand of a worker reaches the signal control box, wherein a rising or falling control signal of the CCTV camera unit, an imaging command signal by the CCTV camera unit, or a transmission and reception control signal of an image is transmitted to the control unit through a drive button provided in the signal control box.

\* \* \* \* \*